United States Patent
Schreiber

(10) Patent No.: US 7,076,942 B2
(45) Date of Patent: Jul. 18, 2006

(54) PROTECTIVE RING FOR THE FAN PROTECTIVE CASING OF A GAS TURBINE ENGINE

(75) Inventor: Karl Schreiber, Mellensee (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 1 day.

(21) Appl. No.: 10/733,363

(22) Filed: Dec. 12, 2003

(65) Prior Publication Data
US 2004/0211167 A1    Oct. 28, 2004

(30) Foreign Application Priority Data
Dec. 20, 2002 (DE) ................ 102 59 943

(51) Int. Cl.
*F01D 21/00* (2006.01)
*F02K 3/04* (2006.01)

(52) U.S. Cl. ............................. 60/223; 415/9
(58) Field of Classification Search ........ 60/223; 415/9
See application file for complete search history.

(56) References Cited

U.S. PATENT DOCUMENTS

| | | | | |
|---|---|---|---|---|
| 4,057,359 A | * | 11/1977 | Grooman | ............... 415/9 |
| 4,377,370 A | * | 3/1983 | Porcelli | ............... 415/9 |
| 4,411,589 A | * | 10/1983 | Joubert et al. | ............ 415/9 |
| 4,490,092 A | | 12/1984 | Premont | |
| 4,699,567 A | | 10/1987 | Stewart | |
| 4,718,818 A | | 1/1988 | Premont | |
| 4,818,176 A | | 4/1989 | Huether et al. | |
| 5,272,954 A | * | 12/1993 | Crouch | ............... 89/36.02 |
| 5,486,086 A | | 1/1996 | Bellia et al. | |
| 6,575,694 B1 | * | 6/2003 | Thompson et al. | ............ 415/9 |
| 6,652,222 B1 | * | 11/2003 | Wojtyczka et al. | ............ 415/9 |

FOREIGN PATENT DOCUMENTS

| | | |
|---|---|---|
| DE | 3243887 | 6/1983 |
| DE | 3515835 | 12/1985 |
| DE | 3712830 | 11/1988 |
| DE | 69701831 | 9/1997 |
| EP | 0795682 | 9/1997 |

OTHER PUBLICATIONS

German Search Report dated Apr. 4, 2003.

* cited by examiner

*Primary Examiner*—Ted Kim
(74) *Attorney, Agent, or Firm*—Timothy J. Klima

(57) ABSTRACT

A protective ring (4) for the fan blades (2, 3) of a gas turbine engine includes a material combination of metal bands and polymer-bonded fiber-weave layers interconnected in alternating arrangement. The protective ring thus formed, which is characterized by tough-elastic properties and low weight, can be used as a full containment (4') with sufficiently large wall thickness or as a penetration containment (4") with smaller wall thickness and with a trapping layer arranged on the outer circumference. As a full containment, the protective ring has impact-absorption capacity, as a penetration containment it prevents a further destruction of the broken-through protective ring.

16 Claims, 1 Drawing Sheet

PROTECTIVE RING FOR THE FAN PROTECTIVE CASING OF A GAS TURBINE ENGINE

This application claims priority to German Patent Application DE10259943.3 filed Dec. 20, 2002, the entirety of which is incorporated by reference herein.

BACKGROUND OF THE INVENTION

This invention relates to a protective ring for a fan protective casing of a gas turbine engine in the form of a full containment or in the form of a penetration containment with trapping layer.

During take-off with maximum power demand, the fan of an aircraft jet engine is subject to the highest loads which, under extreme conditions, may lead to a failure of the fan blades, for example if large birds or objects on the runway are ingested by the fan and strike the fan with high kinetic energy. If such an event occurs, any broken-off fan fragments must absolutely be precluded from breaking through the engine casing in order to avoid serious consequences to the aircraft itself. In order to avoid destruction of the engine, a special type of fan protective casing or protective ring, also referred to as a containment, is provided around the particularly endangered casing area on the outer circumference of the fan.

Depending on their design and function, distinction is made between two types of protective casings, namely the full containment and the penetration containment.

The full containment is designed such that a failed fan blade or a blade fragment, while being allowed to cause deformation of the protective ring, will not be able to break through the protective ring. It will finally be discharged from the engine via the by-pass duct without bringing about further damage. This solution, while being functionally favorable, has the disadvantage of high weight, resulting from the compact metal ring of which such a protective casing consists.

A known design of penetration containment comprises a thin-walled metal ring through which the failed fan fragment can break, but with the fan fragment being retained by a weave arranged on the outer circumference of the metal ring, the so-called trapping layer. The penetration containment, which is definitely lighter than and in this respect, superior to the full containment, is, however, problematic in that, upon breakthrough, the damaged fan wheel, which now runs out of balance, will generate vibrations in the engine casing. This can result in an increase of the cracks existing at the point of breakthrough on the metal ring and in corresponding consequential damage.

In the case of a penetration containment described in Specification U.S. Pat. No. 4,699,567, a rigid, thin-walled cylinder made of light metal or fiber-reinforced resin is initially covered with woven fiber-material layers consisting of single material pieces, with the inner layers so formed being wrapped with further fiber-material layers of continuous strip length. The outer surface of the containment is covered with an impermeable metallic or non-metallic protective layer. If a flinging blade fragment breaks through the inner ring (metallic protective ring), it will on its route be first enclosed and padded by the inner fiber-material pieces and finally be caught by the outer, continuous fiber-material layers, these absorbing the impact energy by elastic deformation. A further propagation of the damage existing in the rigid protective ring of the containment can, however, not be avoided.

In a fan casing structure known from Specification U.S. Pat. No. 5,486,086, an inner, rigid safety cylinder (protective ring), which surrounds the fan blades at a certain distance, is provided on the outer surface with a plurality of ribs extending in the longitudinal and circumferential direction, these ribs being intended to prevent the propagation of cracks beyond the rib-reinforced material zones.

BRIEF SUMMARY OF THE INVENTION

The present invention, in a broad aspect, provides a protective ring for the fan wheel of a gas turbine engine which, as a full containment, has a high impact-absorption capacity and a lower weight than the known designs and, as a penetration containment, prevents the cracks or holes produced in the penetration area from propagating or growing.

It is a particular object of the present invention to provide solution to this problem by way of a protective ring designed according to the description herein. Further objects and advantages of the present invention will be apparent from the description below.

The idea underlying the present invention is that the protective ring, which is arranged remotely of the outer circumference of the fan, includes an alternation of several strata of sheet-metal bands and polymer-bonded fiber weave layers. Instead of sheet metal, the inner metallic bands can also include a metal weave. According to the number of strata, the protective ring can either be applied as a full containment, in which case it is provided with a sufficiently large wall thickness, or as a penetration containment, in which case it is provided with a smaller wall thickness and with a trapping layer arranged on the outer circumference. As a full containment, the protective ring has tough-elastic properties enabling it to absorb any impact of fan blade fragments without destruction of the protective ring material. As a penetration containment, a breakthrough of the protective ring with its small wall thickness is deliberately accepted, with the fragments finally being retained in the trapping layer.

Owing to the material combination in accordance with the present invention of thin sheet-metal layers and polymer-bonded fiber layers in alternating arrangement and in intimate adhesive bond, a growth of the holes and cracks in the protective ring, as well as consequential damage to engine and aircraft, can be excluded, despite the imbalance of the damaged fan disk and the correspondingly high mechanical load. A further, major advantage of this type of protective ring is the considerable weight savings, both in its form as a penetration containment and, especially, in its form as a full containment.

For the production of a closed protective ring, the ends of the respective metal bands are lap-bonded by means of an adhesive, while the fiber-weave layers extend continuously between the opposite ends of adjacent metal bands. This ensures the intended properties and an intimate bond also at the joint. In order to obtain large wall thicknesses of the protective ring, a material strip of smaller thickness can also be wound to a protective ring, or two or more protective rings with matching inner and outer diameters can be put into each other and bonded at the mating faces.

BRIEF DESCRIPTION OF THE DRAWINGS

The present invention is more fully described in the light of the accompanying drawings showing an embodiment. In the drawings.

DETAILED DESCRIPTION OF THE INVENTION

Figure 1:
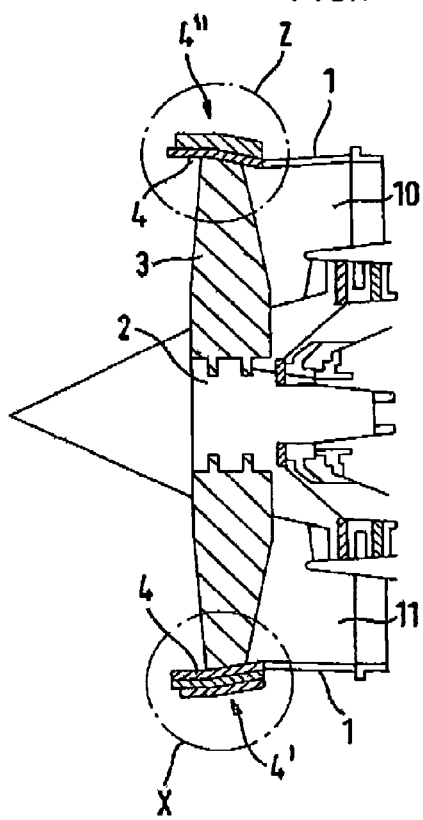
FIG. 1 is a sectional view of the air intake area of a gas turbine engine in schematic representation.

FIG. 1 shows the air intake area of a gas turbine engine, in particular a fan wheel rotating in an engine casing 1, with the fan wheel including a fan disk 2 and the fan blades 3 carried by this disk. For the protection of the engine casing and the engine, a protective ring (containment) 4 is provided on the inner circumference of the engine casing 1 in the area above the fan blades 3. If an object, for example a large bird, should strike a fan blade 3 and cause the fan blade 3 to fail, an event which is more likely in the take-off phase, the protective ring 4 will preclude the fan blade fragments from destroying the engine or the engine casing. For simplicity reasons, the protective ring 4 is shown in FIG. 1 both as a multi-part full-protection ring or full containment 4' (detail X) and as a penetration containment 4" (detail Z). Actually, either a circumferential full-protection ring (as full containment 4') or a circumferential penetration-protection ring with trapping provision (as penetration containment 4") can be arranged remotely beyond the ends of the fan blades 3.

Arranged between two flanges 5, the penetration containment 4" comprises a penetration sleeve 6 made of several material layers and a trapping layer 7 including woven and/or knitted fiber material layers applied to the outer circumference of the protective ring 4. As fiber material, aromatic polyamide fibers are used, preferably commercial fiber materials known as KEVLAR.

Figure 4:
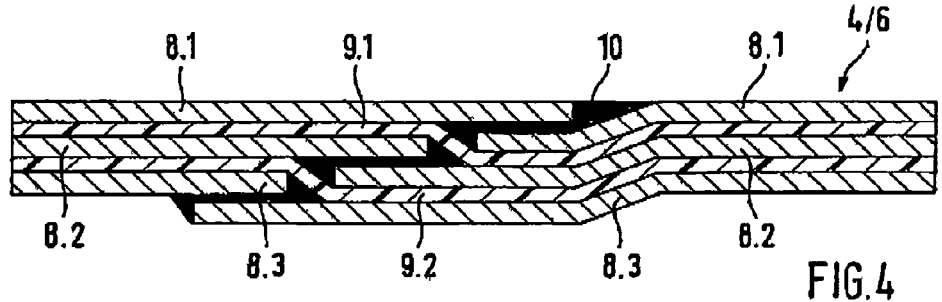
FIG. 4 is an enlarged representation of the composite material provided for the protective ring at the joint of the ends.

While the fragments of a failed fan blade 3 may break through the penetration sleeve 6 (protective ring) in this embodiment, they will be caught by the fiber material of the trapping layer 7 and thus precluded from causing consequential damage. The main point is that the propagation or growth of the cracks or holes produced by the fan blade fragments breaking through the penetration sleeve 6 is avoided, despite the considerable imbalance of the fan wheel caused by a fan blade failure. Such an increase of the cracks or holes is avoided by a special design of the penetration sleeve 6 in a material combination which, as shown in FIG. 4, includes an alternation of several metal bands 8 and polymer-impregnated fiber-weave layers 9. The high mechanical load imposed on the penetration sleeve 6 by the imbalance of the fan wheel after the above-mentioned damage will be elastically taken up by the thin metal bands 8 (8.1, 8.2, 8.3) and the fiber-weave layers 9 (9.1, 9.2), with any cracks and holes being elastically held together or bridged by the transverse fibers of the fiber-weave layers 9 which permit no, or only very slow, propagation of cracks.

FIG. 4 shows a sectional view of a part of a penetration sleeve 6 at the joint of its two ends. As can be seen, the ends of the respective metal bands 8 overlap, while the fiber-weave layers 9 extend continuously also at the joint and passes through the adhesive-filled space between two opposite ends of different metal bands 8.1 and 8.2 or 8.2 and 8.3, respectively. This means that the overlapping, or opposite, metal band ends are bonded by an adhesive 10.

In the embodiment here shown, the penetration sleeve 6 includes five layers, namely three metal bands 8.1, 8.2 and 8.3 and two fiber-polymer-composite layers 9.1 and 9.2. However, the outer and inner layer will preferably be metal bands 8.1, 8.3 which also act as a humidity barrier. The penetration sleeve 6 can be manufactured in different thicknesses by adding or subtracting layers to provide the desired strength for specific applications.

Figure 2:
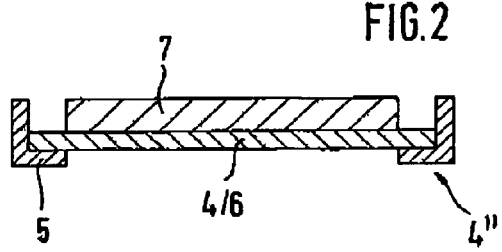
FIG. 2 is a detail view Z of FIG. 1 showing a section through the wall of a penetration-protection ring (penetration containment) in schematic representation.
Figure 3:
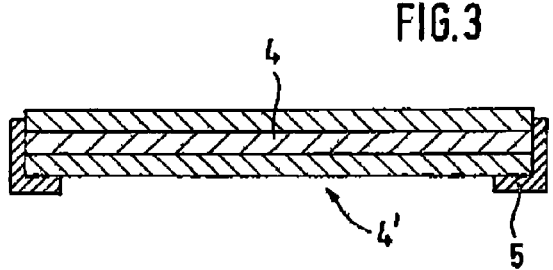
FIG. 3 is a detail view X of FIG. 1 showing a section through the wall of a full-protection ring (full containment) in schematic representation.

In the case of the full containment 4' embodiment (full-protection ring) shown in FIG. 3 (detail X in FIG. 1), the trapping layer 7 has been omitted. Instead, the wall thickness of the penetration sleeve 6 and, accordingly, the number of alternating metal bands and polymer-impregnated fiber-weave layers is selected such that the protective ring 4 will not be broken through by the fan blade fragments, these being discharged rearward via free passages 11 of the engine. Thus, the penetration sleeve 6 will be thicker than in the embodiment of FIG. 2. This additional thickness of the penetration sleeve can be obtained by adding layers to a single penetration sleeve 6.

Alternatively, a winding process can be used to provide the required thickness. For instance, to obtain the wall thickness required for the protective ring 4 for a full containment 4' and still provide for formability when making the ring, a thin, just easily deformable material strand can be wound to obtain a penetration sleeve 6 for a full-protection ring with the required wall thickness. In another alternative, two or more individual penetration sleeves 6 each having thinner wall thicknesses but sized with correspondingly matching diameters so as to be able to nest in one another can be assembled together to provide the overall thickness required, as shown with the three penetration sleeves 6 of FIG. 3, but as discussed, a single penetration sleeve 6 can also be used as long as it has the desired thickness.

The protective ring 4 (full-protection ring) thus made, while being significantly lighter than the known full-protection rings, absorbs the impacts produced by the impinging blade fragments and cushions them off elastically. A growth of any impact-caused cracks as a result of the imbalance of the engine caused by the damage and fracture will, however, be precluded by the elastic, polymer-bonded fiber-weave layers intimately bonded to the metal bands.

Various aspects of the different embodiments can be combined in different manners to create new embodiments.

What is claimed is:

1. A protective ring for a fan protective casing of a gas turbine engine, comprising a penetration sleeve having an alternation of several, interconnected strata, each comprising a metal band and a polymer-impregnated fiber-weave layer; wherein opposite circumferential ends of each respective metal band circumferentially overlap one another and respective ones of the fiber-weave layers extend between the circumferentially overlapped ends of adjacent metal bands.

2. A protective ring in accordance with claim 1, wherein the polymer-impregnated fiber-weave layers comprise at least one of glass fibers, polyethylene fibers, polyamide fibers, aramide fibers and carbon fibers impregnated with at least one of polyester and highly energy-absorbing resins, and the metal bands are constructed of at least one of aluminum, titanium and nickel base alloy.

3. A protective ring in accordance with claim 2, wherein at least one of polyamide and polyethylene fibers known under the trade names KEVLAR and DYNEEMA, respectively, are included in the fiber-weave layers.

4. A protective ring in accordance with claim 3, wherein both an inner and outer circumferential surface are each formed by a metal band.

5. A protective ring in accordance with claim 4, wherein multi-stratum strips of metal bands and fiber-weave layers are joined at the ends by an adhesive to form the protective ring.

6. A protective ring in accordance with claim 5, comprising at least two penetration sleeves with matching diameters assembled into one another to obtain a specific large wall thickness.

7. A protective ring in accordance with claim 1, wherein multi-ply strips of metal bands and polymer-bonded fiber-weave layers are wound spirally to obtain a protective ring of sufficient wall thickness.

8. A protective ring in accordance with claim 1, having sufficiently large wall thickness to act as a full containment.

9. A protective ring in accordance with claim 1, comprising a trapping layer of fiber material positioned outside the penetration sleeve for arresting breakthrough of fan blade fragments.

10. A protective ring in accordance with claim 1, comprising outer and inner bands constructed of sheet metal and at least one metallic intermediate band constructed of a metal weave of at least one of nickel, titanium, iron and aluminum.

11. A protective ring in accordance with claim 1, wherein the fiber layers are wound and comprising two outer flanges being conformally integrated by the wound fiber layers.

12. A protective ring in accordance with claim 1, wherein both an inner and outer circumferential surface are each formed by a metal band.

13. A protective ring in accordance with claim 12, wherein multi-stratum strips of metal bands and fiber-weave layers are joined at the ends by an adhesive to form the protective ring.

14. A protective ring in accordance with claim 13, comprising at least two penetration sleeves with matching diameters assembled into one another to obtain a specific large wall thickness.

15. A protective ring in accordance with claim 1, wherein multi-stratum strips of metal bands and fiber-weave layers are joined at the ends by an adhesive to form the protective ring.

16. A protective ring in accordance with claim 1, comprising at least two penetration sleeves with matching diameters assembled into one another to obtain a specific large wall thickness.

* * * * *